US011001659B1

(12) United States Patent
Meier et al.

(10) Patent No.: US 11,001,659 B1
(45) Date of Patent: May 11, 2021

(54) METHOD FOR THE IMPROVED OXIDATION OF SECONDARY AMINE GROUPS

(71) Applicant: Evonik Operations GmbH, Essen (DE)

(72) Inventors: Christian Meier, Darmstadt (DE); Michael Flittner, Mömbris (DE); Christine Körner, Aschaffenburg (DE); Michael Korell, Bochum (DE); Jörn Klaus Erich Wolf, Essen (DE)

(73) Assignee: Evonik Operations GmbH, Essen (DE)

( * ) Notice: Subject to any disclaimer, the term of this patent is extended or adjusted under 35 U.S.C. 154(b) by 426 days.

(21) Appl. No.: 16/306,192

(22) PCT Filed: Aug. 31, 2017

(86) PCT No.: PCT/EP2017/071876
§ 371 (c)(1),
(2) Date: Nov. 30, 2018

(87) PCT Pub. No.: WO2018/046387
PCT Pub. Date: Mar. 15, 2018

(30) Foreign Application Priority Data

Sep. 6, 2016 (EP) .................. 16187383.1

(51) Int. Cl.
C08F 220/34 (2006.01)
H01M 4/60 (2006.01)
H01M 10/0525 (2010.01)

(52) U.S. Cl.
CPC ........... C08F 220/34 (2013.01); H01M 4/604 (2013.01); H01M 10/0525 (2013.01); C08F 2800/20 (2013.01); C08F 2810/00 (2013.01)

(58) Field of Classification Search
CPC .................. C08F 220/10; C08F 220/18; C08F 220/1802; C08F 220/1803; C08F 220/1804; C08F 220/1805; C08F 220/1806; C08F 220/1807; C08F 220/1808; C08F 220/1809; C08F 220/1811; C08F 220/1812; C08F 220/1818; C08F 220/34; C08F 220/343; C08F 220/346; C08F 220/36; C08F 220/365; C08F 220/38; C08F 220/382; C08F 220/385; C08F 220/387; C08F 220/5254; C08F 220/56; C08F 220/58; C08F 220/585; C08F 220/60; C08F 220/603; C08F 220/606; C08F 226/00; C08F 226/06; C08F 226/08; C08F 226/10; C08F 226/12; C08F 216/00; C08F 216/1458; C08F 216/1475; C08F 216/1483; C08F 216/1491; C08F 2800/00; C08F 2800/10; C08F 2800/20; C08F 2810/00; C08F 2810/50; H01M 4/00; H01M 4/02; H01M 4/36; H01M 4/60; H01M 4/602; H01M 4/604; H01M 4/608
See application file for complete search history.

(56) References Cited

U.S. PATENT DOCUMENTS

| | | | |
|---|---|---|---|
| 4,933,394 A | 6/1990 | Foos | |
| 4,999,263 A | 3/1991 | Kabata et al. | |
| 5,416,215 A | 5/1995 | Büschken et al. | |
| 7,351,867 B2 | 4/2008 | Tanielyan et al. | |
| 9,276,292 B1 | 3/2016 | MacKenzie et al. | |
| 9,397,341 B2 | 7/2016 | Lockett et al. | |
| 9,520,598 B2 | 12/2016 | Lockett et al. | |
| 9,666,380 B1 | 5/2017 | Lai et al. | |
| 9,890,230 B2 | 2/2018 | Haeupler et al. | |
| 10,103,384 B2 | 10/2018 | Haeupler et al. | |
| 2002/0041995 A1 | 4/2002 | Bannai et al. | |
| 2002/0041996 A1 | 4/2002 | Morioka et al. | |
| 2003/0062080 A1 | 4/2003 | Satoh et al. | |
| 2003/0096165 A1 | 5/2003 | Nakahara et al. | |
| 2004/0115529 A1 | 6/2004 | Nakahara et al. | |
| 2005/0170247 A1 | 8/2005 | Nakahara et al. | |
| 2005/0260500 A1 | 11/2005 | Iwasa et al. | |
| 2007/0078284 A1 | 4/2007 | Tanielyan et al. | |
| 2008/0038636 A1 | 2/2008 | Suguro et al. | |
| 2008/0171265 A1 | 7/2008 | Iriyama et al. | |
| 2008/0213669 A1 | 9/2008 | Nakahara et al. | |
| 2008/0226986 A1 | 9/2008 | Nakahara et al. | |
| 2008/0297350 A1 | 12/2008 | Iwasa et al. | |
| 2009/0156706 A1 | 6/2009 | Rolfe et al. | |
| 2009/0306304 A1 | 12/2009 | Fujimoto et al. | |
| 2010/0167129 A1 | 7/2010 | Wu et al. | |
| 2010/0168360 A1 | 7/2010 | Fujimoto | |
| 2010/0233537 A1 | 9/2010 | Nesvadba et al. | |
| 2010/0255372 A1 | 10/2010 | Suguro et al. | |

(Continued)

FOREIGN PATENT DOCUMENTS

| | | |
|---|---|---|
| CN | 101401234 | 4/2009 |
| CN | 101484477 | 7/2009 |
| CN | 101583635 | 11/2009 |
| CN | 101632198 | 1/2010 |
| CN | 104277227 | 1/2015 |

(Continued)

OTHER PUBLICATIONS

Liang Wenzhong, "Effect of Structure of Polymeric Hindered Amines on the Oxidation of Polymers: Part 1—Syntheses of Polymeric Hindered Piperidyl Esters," Polymer Degradation and Stability 31, 353-364, 1991. (Year: 1991).*

(Continued)

Primary Examiner — Christopher M Rodd
(74) Attorney, Agent, or Firm — Grüneberg and Myers PLLC

(57) ABSTRACT

The present invention relates to a process for oxidizing secondary amino groups to the corresponding radical nitroxyl groups within a polymer comprising, for example, 2,2,6,6-tetramethylpiperidinyl units. The process assures a particularly high degree of oxidation.

11 Claims, No Drawings

(56) References Cited

U.S. PATENT DOCUMENTS

| | | | |
|---|---|---|---|
| 2011/0006294 | A1 | 1/2011 | Tanaka et al. |
| 2011/0129730 | A1 | 6/2011 | Kasai et al. |
| 2012/0095179 | A1 | 4/2012 | Nishide et al. |
| 2012/0100437 | A1 | 4/2012 | Nakahara et al. |
| 2012/0171561 | A1 | 7/2012 | Iwasa et al. |
| 2012/0187387 | A1 | 7/2012 | Sekiguchi et al. |
| 2013/0183782 | A1 | 7/2013 | Mima |
| 2013/0189571 | A1 | 7/2013 | Abouimrane et al. |
| 2013/0209878 | A1 | 8/2013 | Nakahara et al. |
| 2014/0038036 | A1 | 2/2014 | Nishide et al. |
| 2014/0048786 | A1 | 2/2014 | Suzuka et al. |
| 2014/0057167 | A1 | 2/2014 | Suguro et al. |
| 2014/0061532 | A1 | 3/2014 | Nishide et al. |
| 2014/0079984 | A1 | 3/2014 | Kajitani et al. |
| 2014/0087235 | A1 | 3/2014 | Kajitani et al. |
| 2015/0004113 | A1 | 1/2015 | Ritter et al. |
| 2016/0211048 | A1 | 7/2016 | Vlad et al. |
| 2016/0218354 | A1 | 7/2016 | Vlad et al. |
| 2016/0233509 | A1 | 8/2016 | Haeupler et al. |
| 2017/0058062 | A1 | 3/2017 | Schubert et al. |
| 2017/0062825 | A1 | 3/2017 | Schubert et al. |
| 2017/0114162 | A1 | 4/2017 | Haeupler et al. |
| 2017/0162862 | A1 | 6/2017 | Thielen et al. |
| 2017/0179525 | A1 | 6/2017 | Haeupler et al. |
| 2017/0222232 | A1 | 8/2017 | Lockett et al. |
| 2018/0102541 | A1 | 4/2018 | Schubert et al. |
| 2018/0108911 | A1 | 4/2018 | Schubert et al. |
| 2019/0016676 | A1 | 1/2019 | Schmidt et al. |

FOREIGN PATENT DOCUMENTS

| | | |
|---|---|---|
| EP | 1 128 453 | 8/2001 |
| EP | 1 381 100 | 1/2004 |
| EP | 1 752 474 | 2/2007 |
| EP | 1 911 775 | 4/2008 |
| EP | 2 042 523 | 4/2009 |
| JP | H08-3136 | 1/1996 |
| JP | 3222625 | 10/2001 |
| JP | 2002-117852 | 4/2002 |
| JP | 2002-117854 | 4/2002 |
| JP | 2002-117855 | 4/2002 |
| JP | 2002-298850 | 10/2002 |
| JP | 2002-313344 | 10/2002 |
| JP | 2004-179169 | 6/2004 |
| JP | 2004-200059 | 7/2004 |
| JP | 2004-259618 | 9/2004 |
| JP | 2005-8689 | 1/2005 |
| JP | 2005-11562 | 1/2005 |
| JP | 2005-209498 | 8/2005 |
| JP | 2005-228705 | 8/2005 |
| JP | 2005-228712 | 8/2005 |
| JP | 2006-22177 | 1/2006 |
| JP | 2006-252917 | 9/2006 |
| JP | 2007-157388 | 6/2007 |
| JP | 2007-157496 | 6/2007 |
| JP | 2007-165054 | 6/2007 |
| JP | 2007-227147 | 9/2007 |
| JP | 2007-236142 | 9/2007 |
| JP | 2008-81557 | 4/2008 |
| JP | 2008-88330 | 4/2008 |
| JP | 2008-101037 | 5/2008 |
| JP | 2008-123816 | 5/2008 |
| JP | 2008-154925 | 7/2008 |
| JP | 2008-159526 | 7/2008 |
| JP | 2008-174725 | 7/2008 |
| JP | 2008-192452 | 8/2008 |
| JP | 2008-214310 | 9/2008 |
| JP | 2008-218326 | 9/2008 |
| JP | 2008-234909 | 10/2008 |
| JP | 2008-280401 | 11/2008 |
| JP | 2009-1725 | 1/2009 |
| JP | 2009-13093 | 1/2009 |
| JP | 2009-104374 | 5/2009 |
| JP | 2009-104819 | 5/2009 |
| JP | 2009-126869 | 6/2009 |
| JP | 2009-135010 | 6/2009 |
| JP | 2009-140647 | 6/2009 |
| JP | 2009-205918 | 9/2009 |
| JP | 2009-230951 | 10/2009 |
| JP | 2009-238612 | 10/2009 |
| JP | 2009-298873 | 12/2009 |
| JP | 2010-114042 | 5/2010 |
| JP | 2010-163551 | 7/2010 |
| JP | 2010-180285 | 8/2010 |
| JP | 2010-185071 | 8/2010 |
| JP | 2010-238403 | 10/2010 |
| JP | 2011-23333 | 2/2011 |
| JP | 2011-46764 | 3/2011 |
| JP | 2011-74317 | 4/2011 |
| JP | 2011-165433 | 8/2011 |
| JP | 2011-252106 | 12/2011 |
| JP | 2012-28018 | 2/2012 |
| JP | 2012-79639 | 4/2012 |
| JP | 2012-193273 | 10/2012 |
| JP | 2012-219109 | 11/2012 |
| JP | 2012-221574 | 11/2012 |
| JP | 2012-221575 | 11/2012 |
| JP | 2013-87256 | 5/2013 |
| JP | 2013-155267 | 8/2013 |
| JP | 2013-184981 | 9/2013 |
| JP | 5384130 | 10/2013 |
| RU | 2 114 830 | 7/1998 |
| WO | 95/04089 | 2/1995 |
| WO | 2004/077593 | 9/2004 |
| WO | 2005/0078830 | 8/2005 |
| WO | 2005/078831 | 8/2005 |
| WO | 2006/082708 | 8/2006 |
| WO | 2007/066624 | 6/2007 |
| WO | 2007/115939 | 10/2007 |
| WO | 2007/141913 | 12/2007 |
| WO | 2008/099557 | 8/2008 |
| WO | 2009/038125 | 3/2009 |
| WO | 2009/145225 | 12/2009 |
| WO | 2010/002002 | 1/2010 |
| WO | 2010/104002 | 9/2010 |
| WO | 2010/140512 | 12/2010 |
| WO | 2011/034117 | 3/2011 |
| WO | 2012/029556 | 3/2012 |
| WO | 2012/120929 | 9/2012 |
| WO | 2012/133202 | 10/2012 |
| WO | 2012/133204 | 10/2012 |
| WO | 2012/153865 | 11/2012 |
| WO | 2012/153866 | 11/2012 |
| WO | 2013/099567 | 7/2013 |
| WO | 2015/032950 | 3/2015 |
| WO | 2015/032951 | 3/2015 |
| WO | 2017/220965 | 12/2017 |
| WO | 2018/028830 | 2/2018 |

OTHER PUBLICATIONS

International Search Report dated Dec. 21, 2017 in PCT/EP2017/071876.

Written Opinion dated Dec. 21, 2017 in PCT/EP2017/071876.

Bugnon, et al., "*Synthesis of Poly(4-methacryloyloxy-TEMPO) via Group-Transfer Polymerization and Its Evaluation in Organic Radical Battery*," Chem. Mater. 2007, 19, 2910-2914.

Crayston, et al., (1993) "*Polyradicals: Synthetic Strategies and Characterization*," Molecular Crystals and Liquid Crystals Science and Technology. Section A. Molecular Crystals and Liquid Crystals, 236:1, 231-235, 8 pages, DOI: 10.1080/10587259308055233.

Hashimoto et al., "*Development of a Clean Oxidation Method of Producing Functional Chemicals Using Hydrogen Peroxide as an Oxidizing Reagent*," Sumitomo Seika Chemicals Co., Ltd., vol. 57 No. 5 2015, with translation, 18 pages.

Hopff et al., "*Über 2-Vinylthiantren und seine Polymerisationsprodukte*,", Aus dem Technisch-Chemischen Laboratorium der Eidgenössischen Technischen Hochschule Zürich, Dec. 10, 1962, with translation, 24 pages.

Janoschka, et al., "*Stromspeicher Radikal organisch*," Nachrichten aus der Chemie, 60, Jul./Aug. 2012, with translation, 11 pages.

(56) References Cited

OTHER PUBLICATIONS

Kamachi et al., "*Electron Exchange Phenomena of Polymers Containing Nitroxyl Radicals*," Polymer Journal, vol. 14, No. 5, pp. 363-369 (1982).

Kim et al., "*Effect of radical polymer cathode thickness on the electrochemical performance of organic radical battery*," Solid State Ionics 178 (2007) 1546-1551.

Kurosaki et al., "*Polymers Having Stable Radicals. I. Synthesis of Nitroxyl Polymers from 4-Methacryloyl Derivatives of 2,2,6,6-Tetramethylpiperidine*," Journal of Polymer Science: Polymer Chemistry Edition, vol. 10. 3295-3310 (1972).

Kurosaki et al., "*Polymers Having Stable Radicals. II. Synthesis of Nitroxyl Polymers from 4-Methacryloyl Derivatives of 1-Hydroxy-2,2,6,6-tetramethylpiperidine*," Journal of Polymer Science: Polymer Chemistry Edition, vol. 12, 1407-1420 (1974).

MacCorquodale et al., "*Synthesis and Electrochemical Characterisation of Poly(Tempo-Acrylate)*," Tetrahedron Letters, vol. 31, No. 5, pp. 771-774, 1990.

Muench et al., "*Polymer-Based Organic Batteries*," ACS Publications, Chem. Rev. 2016, 116, 9438-9484 DOI: 10.1021/acs.chemrev.6b00070.

Nakahara et al., "*Rechargeable batteries with organic radical cathodes*," Chemical Physics Letters 359 (2002) 351-354.

Nesvadba et al., "*Synthesis of a polymeric 2,5-di-t-butyl-1,4-dialkoxybenzene and its evaluation as a novel cathode material*," Synthetic Metals 161 (2011) 259-262 doi:10.1016/j.synthmet.2010.11.030.

Tetsuo Osa, "*New Challenges in Organic Electrochemistry*," 1998, Gordon and Breach Science Publishers, 38 pages.

Park et al., "*Synthesis and Dispersion Characteristics of Multi-Walled Carbon Nanotube Composites with Poly(methyl methacrylate) Prepared by In-Situ Bulk Polymerization*," Macromol. Rapid Commun. 2003, 24, No. 18, 1070-1073 DOI: 10.1002/marc.200300089.

Schmidt et al., "*Poly[N-(10-oxo-2-vinylanthracen-9(10H)-ylidene)cyanamide] as a Novel Cathode Material for Li-Organic Batteries*," Journal of Polymer Science, Part A: Polymer Chemistry 2015, 53, 2517-2523.

Suga et al., "*Emerging N-Type Redox-Active Radical Polymer for a Totally Organic Polymer-Based Rechargeable Battery*," Adv. Mater. 2009, 21, 1627-1630 DOI: 10.1002/adma.200803073.

Suga et al., "*p- and n-Type Bipolar Redox-Active Radical Polymer: Toward Totally Organic Polymer-Based Rechargeable Devices with Variable Configuration*," Adv. Mater. 2011, 23, 751-754 DOI: 10.1002/adma.201003525.

Vlad, et al. "*Melt-Polymerization of TEMPO Methacrylates with Nano Carbons Enables Superior Battery Materials*," ChemSusChem 2015, 8, 1692-1696 DOI: 10.1002/cssc.201500246.

Liang Wenzhong, "*Effect of Structure of Polymeric Hindered Amines on the Oxidation of Polymers: Part 1—Syntheses of Polymeric Hindered Piperidyl Esters*," Polymer Degradation and Stability 31 (1991) 353-364.

U.S. Appl. No. 15/129,910, filed Sep. 28, 2016, 2017/0179525, Haeupler et al.

U.S. Appl. No. 15/568,884, filed Oct. 24, 2017, 2018/0108911, Schubert et al.

U.S. Appl. No. 15/247,434, filed Aug. 25, 2016, 2017/0058062, Schubert et al.

U.S. Appl. No. 15/247,346, filed Aug. 25, 2016, 2017/0062825, Schubert et al.

U.S. Appl. No. 15/568,871, filed Oct. 24, 2017, 2018/0102541, Schubert et al.

U.S. Appl. No. 16/065,895, filed Jun. 25, 2018, 2019/0016676, Schmidt et al.

U.S. Appl. No. 16/306,614, filed Dec. 3, 2018, Wild et al.

Wenzhong et al., "*Purification and characterization of 4-methacryloyloxy-2,2,6,6-tetramethylpiperidine*," (Institute of Chemistry, Chinese Academy of Sciences), 1981, Issue 5, with English translation (8 pages). DOI:10.13822 /j.cnki.hxsj.1981.05.008.

Bales et al., Journal of Physical Chemistry A; 2009, 113(33):9295-9303.

Sinha et al., Journal of Medicinal Chemistry; 1975, 18(7):669-673.

\* cited by examiner

METHOD FOR THE IMPROVED OXIDATION OF SECONDARY AMINE GROUPS

The application is a National Stage entry under § 371 of International Application No. PCT/EP2017/071876, filed on Aug. 31, 2017, and claims priority to European Patent Application No. 16187383.1, filed on Sep. 6, 2016, the entire contents of which are hereby incorporated by reference.

The present invention relates to a process for oxidizing secondary amino groups to the corresponding radical nitroxyl groups within a polymer comprising, for example, 2,2,6,6-tetramethylpiperidinyl units. The process assures a particularly high degree of oxidation.

BACKGROUND OF THE INVENTION

Organic batteries are electrochemical cells which use an organic charge storage material as active electrode material for storing electrical charge. These secondary batteries are notable for their exceptional properties, such as fast chargeability, long lifetime, low weight, high flexibility and ease of processability. Active electrode materials for charge storage which have been described in the prior art are various polymeric structures, for example polymeric compounds having organic nitroxyl radicals as active units (for example in VW 2012/133202 A, WO 2012/133204 A1, WO 2012/120929 A1, WO 2012/153866 A1. WO 2012/153865 A1, JP 2012-221574 A, JP 2012-221575 A, JP 2012-219109 A, JP 2012-079639 A. WO 2012/029558 A1, WO 2012/153865 A1. JP 2011-252106 A, JP 2011-074317 A, JP 2011-165433 A, WO 2011034117 A, WO 2010/140512 A, WO 2010/104002 A1. JP 2010-238403 A, JP 2010-163551 A, JP 2010-114042 A. WO 2010/002002 A1, WO 2009/038125 A1, JP 2009-298873 A, WO 2004/077593 A1, WO 2009/145225 A1, JP 2009-238612 A, JP 2009-230951 A, JP 2009-205918 A, JP 2008-234909 A, JP 2008-218326 A, WO 2008/099557 A1, WO 2007/141913 A, US 2002/0041995 A1, EP 1128453 A2; A. Vlad, J. Rolland, G. Hauffman, B. Ernould, J.-F. Gohy, ChemSusChem 2015, 8.1692-1696) or polymeric compounds having organic phenoxyl radicals or galvinoxyl radicals as active units (for example US 2002/0041995 A1, JP 2002-117852 A).

Particular emphasis should be given here to poly(2,2,6,6-tetramethylpiperidinyloxylmethacrylate), the synthesis of which is described by K. Nakahara, S. Iwasa, M. Satoh, Y. Morioka, J. Iriyama, M. Suguro, E. Hasegawa, Chem Phys Lett 2002, 359, 351-354 and J. Kim, G. Cheruvally, J. Choi, J. Ahn, S. Lee, S. Choi, C. Song, Solid State Ionics 2007, 178, 1546-1551. Further synthesis methods are described in the following publications: JP 2006-022177 A, WO 2015/032951 A1, EP 1 752 474 A1, EP 1911 775 A1, EP 2 042 523 A1. Moreover, Liang Wenzhong also describes, in *Polymer Degradation and Stability* 1991, 31, 353-364, nitroxidation to form this polymer, wherein the solvent used is ethanol in excess.

Particular emphasis should be given to EP 1911 775 A1, which describes a process for polymerizing 2,2,6,6-tetramethylpiperidinyl methacrylate and subsequently oxidizing the secondary amino groups within the 2,2,6,6-tetramethylpiperidinyl unit to give a radical 2,2,6,6-tetramethylpiperidinyloxyl group ("nitroxylation" hereinafter). The nitroxylation level (or oxidation level) achieved in this prior art document is high at 95.5%. There is nevertheless still a need to achieve an even better degree of oxidation.

In addition, EP 1 911 775 A1 states in paragraph [0046] that the process is applicable within a wide temperature range of 0 to 90° C. Nevertheless, it is apparent from the example of EP 1 911 775 A1 described in paragraphs [0053], [0054] and [0055] that the polymerization should best be conducted at high temperatures such as 80° C.

However, performance at such a high temperature is economically disadvantageous. On the industrial scale in particular, it is desirable to be able to conduct of this reaction without having to expend additional energy for heating of the reaction solution. In some cases, it is additionally also desirable to be able to conduct the reaction with cooling below 0° C., since the cooling allows better control over the occurrence of significant exotherms.

The problem addressed by the present invention is therefore that of providing a process which achieves maximum oxidation of the secondary amino groups in a polymer comprising 2,2,6,6-tetramethylpiperidinyl groups or similar groups to radical nitroxyl groups. The process should lead to better oxidation rates, specifically also at room temperature and lower temperatures.

A process which solves the aforementioned problem has now surprisingly been found.

DETAILED DESCRIPTION OF THE INVENTION

1) The present invention accordingly relates to processes for preparing a polymer $P^1$ comprising $n^1$ repeat units of the general chemical structure (I)

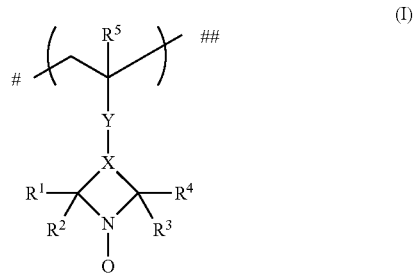

which is characterized in that a polymer $P^2$ comprising $n^2$ repeat units of the general chemical structure (i)

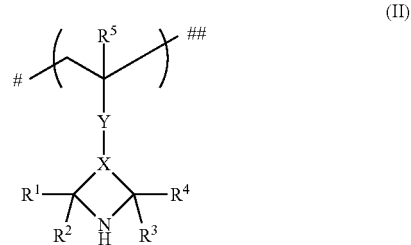

is oxidized in a solvent comprising water and ethanol, where the ethanol is present in the solvent in deficiency relative to water, especially at a temperature $T_1 \leq 40°$ C., where $n^1$, $n^2$ are each independently an integer in the range of 4-3 000 000, especially 4-1 000 000, preferably 4-100 000, more preferably 4-10 000, even more preferably 4-5000, where the repeat units of the chemical structure (I) within the polymer $P^1$ are the same or at least partly different from one another, where the repeat units of the chemical structure (I) within the polymer $P^1$ are joined to one another in such a way that the bond identified by "#" in a particular repeat unit is joined to the bond identified by "##" in the adjacent repeat unit, where the repeat units of the chemical structure (II) within the polymer $P^2$ are the same or at least partly different from one another, where the repeat units of the chemical structure (II) within the polymer $P^2$ are joined to one another in such a way that the bond identified by "#" in a particular repeat unit is joined to the bond identified by "##" in the adjacent repeat unit, and where, in the chemical structures (I) and (III), the $R^1$, $R^2$, $R^3$, $R^4$, $R^5$ radicals are selected from the group consisting of hydrogen, branched or unbranched alkyl group having 1 to 4 carbon atoms, preferably $R^1$, $R^2$, $R^3$, $R^4$=methyl and $R^5$=hydrogen or methyl, X is selected from the group consisting of *—$CH_2$—C'H—$CH_2$—**, *—C'H—$CH_2$—**, *—C'=CH—**, where "*" in each case denotes the bond to the carbon atom joined to $R^1$ and $R^2$, where "**" in each case denotes the bond to the carbon atom joined to $R^3$ and $R^4$, where "C'" denotes a carbon atom additionally joined to the Y radical, where Y is selected from the bridging radicals (III) and (IV), where (III) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$,&&, and where (IV) has the structure &—$(Y^5)_{p9}$—$(C=X^3)_{p8}$—$(Y^6)_{p7}$—&&, where, in the bridging radicals (III) and (IV), p1, p2, p3 are each 0 or 1, with the proviso that it is not simultaneously the case that p1=p3=1 and p2=0, p4, p5, p6 are each 0 or 1, with the proviso that it is not simultaneously the case that p4=p6=1 and p5=0, p7, p8, p9 are each 0 or 1, with the proviso that it is not simultaneously the case that p7=p9=1 and p8=0, and that, when p7=1 and p8=0, p9=0, $X^1$, $X^2$, $X^3$ are independently selected from the group consisting of O, S.

$Y^1$, $Y^2$, $Y^3$, $Y^4$, $Y^5$, Y are independently selected from the group consisting of O, S, NH, N-alkyl, and where $Y^1$, when p1=1, p2=p3=0, may also be N O., and where $Y^1$, when p4=1, p5=p6=0, may also be N O., and where $Y^5$, when p9=1, p7=p8=0, may also be N O., B is a divalent, optionally substituted (hetero)aromatic radical or a divalent, optionally substituted aliphatic radical, where the optionally substituted aliphatic radical may additionally have at least one group selected from ether, thioether, optionally nitroxylated amino ether, carbonyl group, carboxylic ester group, carboxamide group, sulphonic ester group, phosphoric ester, and where "&&" for Y denotes the bond via which Y is joined to X and where "&" for Y denotes the bond via which Y is joined to the carbon atom joined to $R^5$.

2) In a particular embodiment of the present invention, the invention relates to a process for preparing a polymer $P^1$ comprising $n^1$ repeat units of the general chemical structure (I)

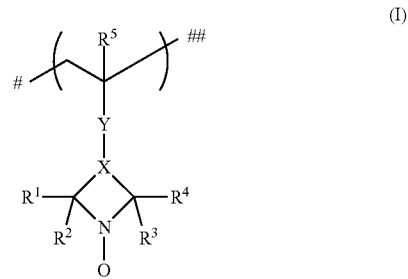

which is characterized in that a polymer $P^2$ comprising $n^2$ repeat units of the general chemical structure (II)

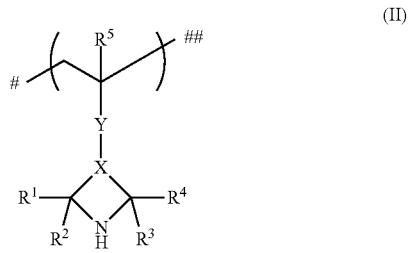

is oxidized in a solvent comprising water and ethanol, where the ethanol is present in the solvent in deficiency relative to water, especially at a temperature $T_1 \leq 40°$ C., where $n^1$, $n^2$ are each independently an integer in the range of 4-3 000 000, especially 4-1 000 000, preferably 4-100 000, more preferably 4-10 000, even more preferably 4-5000, where the repeat units of the chemical structure (I) within the polymer $P^1$ are the same or at least partly different from one another, where the repeat units of the chemical structure (I) within the polymer $P^1$ are joined to one another in such a way that the bond identified by "#" in a particular repeat unit is joined to the bond identified by "##" in the adjacent repeat unit, where the repeat units of the chemical structure (II) within the polymer $P^2$ are the same or at least partly different from one another, where the repeat units of the chemical structure (II) within the polymer $P^2$ are joined to one another in such a way that the bond identified by "#" in a particular repeat unit is joined to the bond identified by "##" in the adjacent repeat unit, and where, in the chemical structures (I) and (II), the $R^1$, $R^2$, $R^3$, $R^4$, $R^5$ radicals are selected from the group consisting of hydrogen, branched or unbranched alkyl group having 1 to 4 carbon atoms, preferably $R^1$, $R^2$, $R^3$, $R^4$=methyl and $R^5$=hydrogen or methyl, X is selected from the group consisting of *—$CH_2$—C'H—$CH_2$—**, *—C'H—$CH_2$—**, *—C'=CH—**, where "*" in each case denotes the bond to the carbon atom joined to $R^1$ and $R^2$, where "**" in each case denotes the bond to the carbon atom joined to $R^3$ and $R^4$, where "C'" denotes a carbon atom additionally joined to the Y radical, where Y is selected from the bridging radicals (III) and (IV), where (III) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$,&&, and where (IV) has the structure &—$(Y^5)_{p9}$—(C=$X^3)_{p8}$—$(Y^6)_{p7}$—&&, where, in the bridging radicals (III) and (IV).

p1, p2, p3 are each 0 or 1, with the proviso that it is not simultaneously the case that p1=p3=1 and p2=0, p4, p5, p6 are each 0 or 1, with the proviso that it is not simultaneously the case that p4=p6=1 and p5=0, p7, p8, p9 are each 0 or 1, with the proviso that it is not simultaneously the case that p7=p9=1 and p8=0, and that, when p7=1 and p8=0, p9=0, $X^1$, $X^2$, $X^3$, $Y^1$, $Y^2$, $Y^3$, $Y^4$, $Y^5$, $Y^6$ are independently selected from the group consisting of O, S, B is a divalent, optionally substituted (hetero)aromatic radical or a divalent, optionally substituted aliphatic radical, where the optionally substituted aliphatic radical may additionally have at least one group selected from ether, thioether, carbonyl group, carboxylic ester group, sulphonic ester group, phosphoric ester, and where "&&" for Y denotes the bond via which Y is joined to X and where "&" for Y denotes the bond via which Y is joined to the carbon atom joined to $R^5$.

3) In a preferred embodiment of the present invention, the invention relates to a process for preparing a polymer $P^1$ comprising $n^1$ repeat units of the general chemical structure (I)

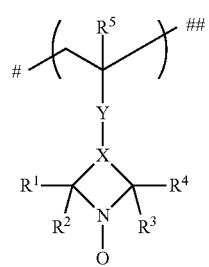

(I)

which is characterized in that a polymer $P^2$ comprising na repeat units of the general chemical structure (II)

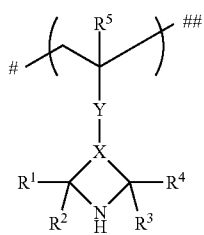

(II)

is oxidized in a solvent comprising water and ethanol, where the ethanol is present in the solvent in deficiency relative to water, especially at a temperature $T_1 \leq 40°$ C., where $n^1$, $n^2$ are each independently an integer in the range of 4-3 000 000, especially 4-1 000 000, preferably 4-100 000, more preferably 4-10 000, even more preferably 4-5000, where the repeat units of the chemical structure (I) within the polymer $P^1$ are the same or at least partly different from one another, where the repeat units of the chemical structure (I) within the polymer $P^1$ are joined to one another in such a way that the bond identified by "#" in a particular repeat unit is joined to the bond identified by "##" in the adjacent repeat unit, where the repeat units of the chemical structure (II) within the polymer $P^2$ are the same or at least partly different from one another, where the repeat units of the chemical structure (II) within the polymer $P^2$ are joined to one another in such a way that the bond identified by "#" in a particular repeat unit is joined to the bond identified by "##" in the adjacent repeat unit, and where, in the chemical structures (I) and (II), $R^1$=$R^2$=$R^3$=$R^4$=methyl and $R^5$=hydrogen or methyl, X is selected from the group consisting of *—$CH_2$—C'H—$CH_2$—**, *—C'H—$CH_2$—**, *—C'=CH—**, where "*" in each case denotes the bond to the carbon atom joined to $R^1$ and $R^2$, where "**" in each case denotes the bond to the carbon atom joined to $R^3$ and $R^4$, where "C'" denotes a carbon atom additionally joined to the Y radical, where Y is selected from the bridging radicals (III) and (IV), where (III) has the structure &—$(Y^1)_{p1}$—[C=$X^1]_{p2}$—$(Y^2)_{p3}$—B—$(Y^3)_{p6}$—[C=$X^2]_{p5}$—$(Y^4)_{p4}$,&&, and where (IV) has the structure &—$(Y^5)_{p9}$—(C=$X^3)_{p8}$—$(Y^6)_{p7}$—&&, where, in the bridging radicals (III) and (IV), p1, p2, p3 are each 0 or 1, with the proviso that it is not simultaneously the case that p1=p3=1 and p2=0, p4, p5, p6 are each 0 or 1, with the proviso that it is not simultaneously the case that p4=p6=1 and p5=0.

p7, p8, p9 are each 0 or 1, with the proviso that it is not simultaneously the case that p7=p9=1 and p8=0, and that, when p7=1 and p8=0, p9=0, $X^1$, $X^2$, $X^3$, $Y^1$, $Y^2$, $Y^3$, $Y^4$, $Y^5$, $Y^6$ are independently selected from the group consisting of O, S, B is a divalent (hetero)aromatic radical, preferably phenylene, or a divalent aliphatic radical optionally substituted by at least one group selected from —F, —Cl, —Br, —I, where the optionally substituted aliphatic radical may additionally have at least one group selected from ether, thioether, and where "&&" for Y denotes the bond via which Y is joined to X and where "&" for Y denotes the bond via which Y is joined to the carbon atom joined to $R^5$.

4) In a more preferred embodiment of the present invention, the invention relates to a process for preparing a polymer $P^1$ comprising $n^1$ repeat units of the general chemical structure (i)

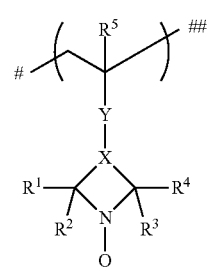

(I)

which is characterized in that a polymer $P^2$ comprising $n^2$ repeat units of the general chemical structure (II)

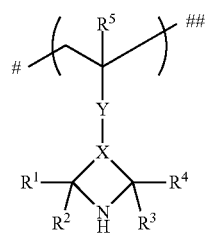

(II)

is oxidized in a solvent comprising water and ethanol, where the ethanol is present in the solvent in deficiency relative to water, especially at a temperature $T_1 \leq 40°$ C., where $n^1$, $n^2$ are each independently an integer in the range of 4-3 000 000, especially 4-1 000 000, preferably 4-100 000, more preferably 4-10 000, even more preferably 4-5000, where the repeat units of the chemical structure (I) within the polymer $P^1$ are the same or at least partly different from one another, where the repeat units of the chemical structure (I) within the polymer $P^1$ are joined to one another in such a way that the bond identified by "#" in a particular repeat unit is joined to the bond identified by "##" in the adjacent repeat unit, where the repeat units of the chemical structure (II) within the polymer $P^2$ are the same or at least partly different from one another, where the repeat units of the chemical structure (II) within the polymer $P^2$ are joined to one another in such a way that the bond identified by "#" in a particular repeat unit is joined to the bond identified by "##" in the adjacent repeat unit, and where, in the chemical structures (I) and (II). $R^1=R^2=R^3=R^4=$methyl and $R^5=$hydrogen or methyl.

X is selected from the group consisting of *—$CH_2$—C'H—$CH_2$—**, *—C'H—$CH_2$—**, *—C'=CH—**, where "*" in each case denotes the bond to the carbon atom joined to $R^1$ and $R^2$, where "**" in each case denotes the bond to the carbon atom joined to $R^3$ and $R^4$, where "C'" denotes a carbon atom additionally joined to the Y radical, where Y is selected from the bridging radicals (III) and (IV), where (III) has the structure &—$(Y^1)_{p1}$—$[C=X^1]_{p2}$—$(Y^2)_{p3}$—B—$(Y^3)_{p6}$—$[C=X^2]_{p5}$—$(Y^4)_{p4}$,&&, and where (IV) has the structure &—$(Y^5)_{p9}$—$(C=X^3)_{p8}$—$(Y^6)_{p7}$—&&, where, in the bridging radicals (III) and (IV), p1, p2, p3 are each 0 or 1, with the proviso that it is not simultaneously the case that p1=p3=1 and p2=0.

p4, p5, p6 are each 0 or 1, with the proviso that it is not simultaneously the case that p4=p6=1 and p5=0, p7, p8, p9 are each 0 or 1, with the proviso that it is not simultaneously the case that p7=p9=1 and p8=0, and that, when p7=1 and p8=0, p9=0, $X^1=X^2=X^3=Y^1=Y^2=Y^3=Y^4=Y^5=Y^6=O$, B is phenylene, or an alkylene radical which is optionally substituted by at least one group selected from —F, —Cl, —Br, —I and is preferably unsubstituted and preferably comprises 1 to 10 carbon atoms, and where "&&" for Y denotes the bond via which Y is joined to X and where "&" for Y denotes the bond via which Y is joined to the carbon atom joined to $R^5$.

In the embodiments described in points 1) to 4), X is selected from the group consisting of *—$CH_2$—C'H—$CH_2$—**, *—C'H—$CH_2$—**, *—C'=CH—**.

When X=*—CH—C'H—$CH_2$—**, the general chemical structure (I) has the following structure (I)', and the general chemical structure (II) has the following structure (II)':

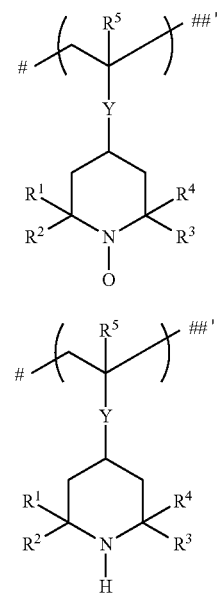

where $R^1$, $R^2$, $R^3$, $R^4$, $R^5$, Y have the definitions described in the respective embodiments.

When X=*—C'H—$CH_2$—, the general chemical structure (I) has the following structure (I)", and the general chemical structure (II) has the following structure (II)":

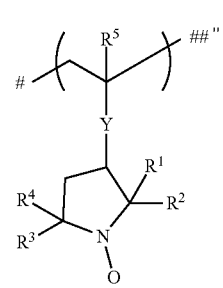

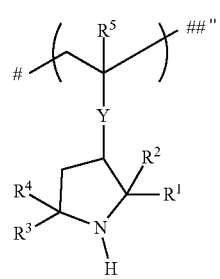

where $R^1$, $R^2$, $R^3$, $R^4$, $R^5$, Y have the definitions described in the respective embodiments.

When X=*—C'=CH₂—**, the general chemical structure (I) has the following structure (I)''', and the general chemical structure (II) has the following structure (II)''':

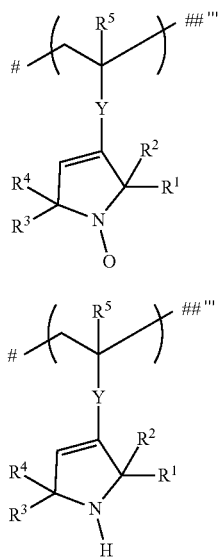

(I)

(II)

where $R^1$, $R^2$, $R^3$, $R^4$, $R^5$, Y have the definitions described in the respective embodiments.

It is particularly preferable here in accordance with the invention and especially in the embodiments cited in points 1) to 4) when X=*—CH₂C'H—CH₂—**.

Most preferably, in the process according to the invention, the general chemical structure (I) has the following structure (I)'''', and the general chemical structure (II) has the following structure (II)'''':

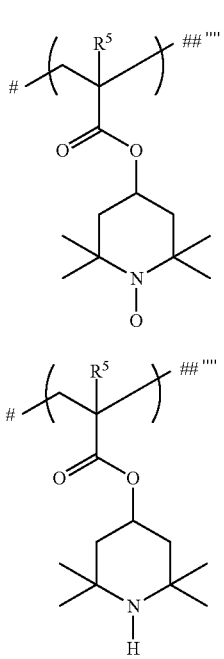

(I)

(II)

where $R^5$=methyl or hydrogen, preferably $R^5$=methyl.

It will be apparent that the bridging radical (IV), when p7=p8=p9=0, may also be a direct bond.

It is a particular feature of the process according to the invention that it is performed at a temperature $T_1 \leq 40°$ C., preferably $-25°$ C.$\leq T_1 \leq 40°$ C., more preferably $-20°$ C.$\leq T_1 \leq 40°$ C., even more preferably $-12°$ C.$\leq T_1 \leq 30°$ C., even more preferably still $0°$ C.$\leq T_1 \leq 25°$ C.

"Where the ethanol is present in the solvent in deficiency relative to water" means especially that the mass ratio of water to ethanol in the solvent is in the range of 51:49 to 99:1, preferably in the range of 1.1:1 to 98:2, more preferably in the range of 55:45 to 95:5, even more preferably in the range of 1.3:1 to 9:1, even more preferably still in the range of 4:1 to 8.5:1, most preferably in the range of 7.1:1 to 8.2:1.

It is further preferable that the proportion of the sum total of the weights of ethanol and water in the solvent is at least 50% by weight, more preferably at least 60% by weight, even more preferably at least 70% by weight, even more preferably at least 80% by weight, yet more preferably at least 90% by weight, even more preferably still at least 95% by weight, most preferably at least 99% by weight, based on the total weight of the solvent.

The solvent may, as well as water and ethanol, include further constituents, especially selected from the group consisting of halogenated hydrocarbons, aliphatic nitriles, aromatic nitriles, alcohols other than ethanol, aromatic hydrocarbons.

However, it is preferable that the proportion by weight of all $C_1$-$C_4$ alcohols other than ethanol in the solvent, more preferably of all $C_1$-$C_{10}$ alcohols other than ethanol in the solvent, is less than 50% by weight, based on the weight of the ethanol encompassed by the solvent.

It is more preferable that the proportion by weight of all $C_1$-$C_4$ alcohols other than ethanol in the solvent, more preferably of all $C_1$-$C_{10}$ alcohols other than ethanol in the solvent, is less than 25% by weight, based on the weight of the ethanol encompassed by the solvent.

It is even more preferable that the proportion by weight of all $C_1$-$C_4$ alcohols other than ethanol in the solvent, more preferably of all $C_1$-$C_{10}$ alcohols other than ethanol in the solvent, is less than 10% by weight, based on the weight of the ethanol encompassed by the solvent.

It is yet more preferable that the proportion by weight of all $C_1$-$C_4$ alcohols other than ethanol in the solvent, more preferably of all $C_1$-$C_{10}$ alcohols other than ethanol in the solvent, is less than 5% by weight, based on the weight of the ethanol encompassed by the solvent.

It is even more preferable still that the proportion by weight of all $C_1$-$C_4$ alcohols other than ethanol in the solvent, more preferably of all $C_1$-$C_{10}$ alcohols other than ethanol in the solvent, is less than 1% by weight, based on the weight of the ethanol encompassed by the solvent.

The solvent is especially used in such an amount that the weight of the solvent used is 1 to 5000 times, preferably 2.5 to 3000 times, more preferably 5 to 100 times and even more preferably 10-50 times the weight of the polymer $P^2$ used.

Oxidizing agents used may likewise be the oxidizing agents familiar to the person skilled in the art. The oxidizing agent is especially selected from the group consisting of peroxides, metal compounds, air, preferably peroxides.

Peroxides are preferably selected from the group consisting of hydrogen peroxide, performic acid, peracetic acid, perbenzoic acid, perphthalic acid, meta-chloroperbenzoic acid. The most preferred peroxide is hydrogen peroxide.

Metal compounds are preferably selected from the group consisting of silver oxide, lead tetraacetate, potassium hexacyanoferrate(III), potassium permanganate.

The reactant $P^2$ used in the process according to the invention can be obtained by prior art methods from commercially available chemicals, for example 2,2,6,6-tetramethyl-4-piperidinyl methacrylate. Such methods are described, for example, in EP 1 752 474 A1 or in European patent application 16172593.2. It is accordingly also additionally possible to use crosslinkers as well as the monomer in the synthesis of $P^2$. Suitable crosslinkers are compounds having more than one polymerizable group, the crosslinker preferably being selected from the group consisting of polyfunctional compounds based on (meth)acrylic acid, polyfunctional compounds based on allyl ether, polyfunctional compounds based on vinylic compounds. Polyfunctional compounds based on (meth)acrylic acid are particularly preferred.

Polyfunctional compounds based on (meth)acrylic acid are especially selected from ethylene glycol di(meth)acrylate, diethylene glycol di(meth)acrylate, triethylene glycol di(meth)acrylate, polyethylene glycol di(meth)acrylate, propane-1,3-diol di(meth)acrylate, butane-2,3-diol di(meth)acrylate, butane-1,4-diol di(meth)acrylate, pentane-1,5-diol di(meth)acrylate, hexane-1,6-diol di(meth)acrylate, heptane-1,7-diol di(meth)acrylate, octane-1,8-diol di(meth)acrylate, nonane-1,9-diol di(meth)acrylate, decane-1,10-diol di(meth)acrylate, trimethylolpropane tri(meth)acrylate, glycerol di(meth)acrylate, 2-hydroxy-3-(meth)acryloyloxypropyl (meth)acrylate.

The oxidizing agent is especially used in such an amount that 1 to 40 mol, more preferably 1.5 to 15 mol, even more preferably 5 to 14.4 mol, yet more preferably 13 to 14 mol and most preferably 13 mol of the oxidizing agent are used per mole of NH group to be oxidized in the polymer $P^2$ used.

In the oxidation, it is additionally also possible to make use of a catalyst. The catalysts used in the nitroxylation are familiar to the person skilled in the art.

More particularly, nitroxylation can be accomplished using catalysts selected from compounds of the metals of the chromium group, especially molybdenum and tungsten. Preferably, the catalyst used for nitroxylation is a compound of tungsten.

Compounds of tungsten are especially selected from the group consisting of tungstic acid, tungstophosphoric acid, paratungstic acid, tungstates, tungstophosphates, paratungstates, tungsten oxides, tungsten carbonyls. Preferably, compounds of tungsten are selected in accordance with the invention from alkali metal salts and ammonium salts of the tungstates, more preferably from the group consisting of ammonium tungstate, sodium tungstate, potassium tungstate, even more preferably sodium tungstate.

Compounds of molybdenum are especially selected from the group consisting of molybdic acid, molybdophosphoric acid, paramolybdic acid, molybdates, moybdophosphates, paramolybdates, molybdenum oxides, molybdenum carbonyls. Preferably, compounds of molybdenum are selected 35 in accordance with the invention from alkali metal salts and ammonium salts of the molybdates, more preferably from the group consisting of ammonium molybdate, sodium molybdate, potassium molybdate, molybdenum trioxide, molybdenum hexacarbonyl.

The catalyst is especially used in such an amount that 0.1 to 10 mol %, more preferably 1 to 5 mol %, even more preferably 2 to 3.5 mol % and even more preferably still 2.5 to 3.0 mol % of the catalyst is used per mole of the compound of the structure (I) used in step (a) of the process according to the invention.

The reaction time is likewise not particularly restricted, and is especially 1 to 100 hours, preferably 3 to 96 hours, even more preferably 10 to 96 hours, yet more preferably 25 to 96 hours, even more preferably still 72 to 96 hours, most preferably 90 to 96 hours.

The polymer $P^1$ obtained is then likewise isolated by methods familiar to the person skilled in the art, such as filtration and subsequent drying.

The end groups of the first repeat unit of the polymer $P^1$ which is present therefor in the chemical structure (I) at the bonds defined by "#", and the end groups of the $n^1$th repeat unit of the polymer $P^1$ according to the invention which is present therefor in the chemical structure (I) at the bonds defined by "##", are not particularly restricted and are a result of the polymerization method used in the method for preparing the polymer $P^1$. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

The end groups of the first repeat unit of the polymer $P^2$ which is present therefor in the chemical structure (I) at the bonds defined by "#", and the end groups of the $n^2$th repeat unit of the polymer $P^2$ according to the invention which is present therefor in the chemical structure (II) at the bonds defined by "##", are not particularly restricted and are a result of the polymerization method used in the method for preparing the polymer $P^2$. Thus, they may be termination fragments of an initiator or a repeat unit. Preferably, these end groups are selected from hydrogen, halogen, hydroxyl, unsubstituted aliphatic radical or aliphatic radical substituted by —CN, —OH, halogen (which may especially be an unsubstituted or correspondingly substituted alkyl group), (hetero)aromatic radical, which is preferably a phenyl radical, benzyl radical or α-hydroxybenzyl.

Definitions

In the context of this invention, some terms are defined as follows:

"Nitroxyl" is a radical N O. function.

Nitroxylation is the oxidation of an NH group to a nitroxyl.

"At least partly different from one another" means, in the context of the invention, with regard to the polymer $P^1$, that at least two repeat units of the chemical structure (i therein differ from one another, and more particularly means that at least two of the n mutually joined repeat units of the chemical structure (I) differ in at least one of the $R^1$, $R^2$, $R^3$, $R^4$, $R^5$, X, Y radicals.

"At least partly different from one another" means, in the context of the invention, with regard to the polymer P, that at least two repeat units of the chemical structure (II) therein differ from one another, and more particularly means that at least two of the n mutually joined repeat units of the chemical structure (II) differ in at least one of the $R^1$, $R^2$, $R^3$, $R^4$, $R^5$, X, Y radicals.

The "degree of oxidation" of the polymer $P^1$ (and if appropriate also of the polymer $P^2$) means the proportion of nitroxyl groups, based on the sum total of all nitroxyl groups and non-nitroxylated secondary NH groups. It is determined in accordance with the invention by ESR. What is being determined here is how many N O. functions are present in the molecule being examined in the particular case via the signal strength of the ESR signal measured based on the amount of the particular polymer used. The standard used in accordance with the invention is TEMPO (2,2,6,6-tetramethylpiperidinyl-N-oxy). Via the determination of the number of N O. functions in the polymer $P^1$ and the comparison of the N O. functions in the polymer $P^2$ used, it is then possible to determine the degree of oxidation and hence the efficiency of the process according to the invention.

"Halogenated hydrocarbons" are preferably selected from the group consisting of dichloromethane, chloroform, dichloroethane. Aliphatic nitriles are preferably selected from the group consisting of acetonitrile, propionitrile, butyronitrile. Aromatic nitriles are preferably selected from the group consisting of benzonitrile, phenylacetonitrile. Alcohols other than ethanol are preferably selected from the group consisting of methanol, n-propanol, iso-propanol, n-butanol, sec-butanol, iso-butanol, tert-butanol, preferably methanol. Aromatic hydrocarbons are preferably selected from the group consisting of benzene, toluene.

"$C_1$-$C_4$ alcohols" in accordance with the invention are especially methanol, ethanol, n-propanol, iso-propanol, n-butanol, sec-butanol, iso-butanol, tert-butanol.

"$C_1$-$C_{10}$ alcohols" in accordance with the invention are especially methanol, ethanol, n-propanol, iso-propanol, n-butanol, sec-butanol, iso-butanol, tert-butanol and all alcohols having 5 to 10 carbon atoms.

"Substituted aliphatic radical" in the context of the invention especially means that, in the aliphatic radical in question, a hydrogen atom bonded to a carbon atom in the group in question is replaced by a group selected from (hetero) aromatic radical, —$NO_2$, —CN, —F, —Cl, —Br, —I, —C(=O)$NR^I R^{II}$, —$NR^{III}R^{IV}$, —C(=O)$OR^V$, preferably —$NO_2$, —CN, —F, —C, —Br, —I, even more preferably —F, —Cl, —Br, —I, most preferably —F, —C, —Br, where $R^I$, $R^{II}$, $R^{III}$, $R^{IV}$, $R^V$ are selected from H, alkyl, haloakyl, aromatic, heteroaromatic, and where $R^{III}$ in the case that $R^{IV}$=alkyl or haloalkyl may also be —O..

An optionally substituted aliphatic radical is preferably unsubstituted.

An optionally substituted alkylene radical is preferably unsubstituted.

An alkylene radical having 1 to 10 carbon atoms especially has 1 to 6 carbon atoms, preferably 1 to 4 carbon atoms and even more preferably 1 to 3 carbon atoms, and is most preferably methylene, ethylene or n-propylene.

An alkyl group having 1 to 10 carbon atoms especially has 1 to 6 carbon atoms, preferably 1 to 4 carbon atoms and even more preferably 1 to 3 carbon atoms, and is most preferably methyl, ethyl or n-propyl.

A (hetero)aromatic radical in the context of the invention is a heteroaromatic or aromatic radical. A (hetero)aromatic radical may be monovalent, i.e. may be bonded to the rest of the molecule via just one of its carbon atoms (in the case of an aromatic radical) or via one of its carbon atoms or heteroatoms (in the case of a heteroaromatic radical).

A (hetero)aromatic radical may alternatively be divalent, i.e. may be bonded to the rest of the molecule via two of its carbon atoms (in the case of an aromatic radical) or may be bonded to the rest of the molecule via two of its carbon atoms, two of its heteroatoms or one of its carbon atoms and one of its heteroatoms (in the case of a heteroaromatic radical).

When they are not referred to explicitly as divalent in this invention, the term "(hetero)aromatic radical" in the context of the invention shall be understood to mean monovalent (hetero)aromatic radicals.

An aromatic radical has exclusively carbon atoms and at least one aromatic ring. An aromatic radical is especially selected from aryl radical, aralkyl radical, alkaryl radical. Aryl radicals have exclusively aromatic rings and are joined to the molecule via a carbon atom in the aromatic ring. An aryl radical is preferably phenyl.

Alkaryl radicals have at least one aromatic ring via which they are joined to the rest of the molecule and additionally also bear alkyl radicals on the aromatic ring. An alkaryl radical is preferably tolyl.

Aralkyl radicals are formally derived by replacement of a hydrocarbyl radical of an alkyl group with an aryl group or an alkaryl group. An alkaryl radical is preferably benzyl, phenylethyl, α-methylbenzyl.

A heteroaromatic radical is especially selected from heteroaryl radical, heteroaralkyl radical, alkylheteroaryl radical. It is an aromatic radical which additionally has at least one heteroatom, especially a heteroatom selected from the group consisting of nitrogen, oxygen, sulphur, within the aromatic ring or, in the case of a heteroaralkyl radical or of an alkylheteroaryl radical, alternatively or additionally outside the aromatic ring.

Preferred (hetero)aromatic radicals are selected from the group consisting of a ring of the above-defined chemical structure (III), azole, imidazole, pyrrole, pyrazole, triazole, tetrazole, thiophene, furan, thiazole, thiadiazole, oxazole, oxadiazole, pyridine, pyrimidine, triazine, tetrazine, thiazine, benzofuran, purine, indole, 9-anthryl, 9-phenanthryl.

A divalent (hetero)aromatic radical in the context of the invention is a divalent aromatic radical or a divalent heteroaromatic radical, preferably a divalent aromatic radical.

According to the invention, a divalent aromatic radical is a divalent hydrocarbyl group having at least 6 and preferably 6 to 30 carbon atoms, of which at least 6 carbon atoms are present in an aromatic system and the other carbon atoms, if present, are saturated. The divalent aromatic radical may be joined to the rest of the molecule via carbon atoms in the aromatic system or, if present, saturated carbon atoms.

Preferably, a divalent aromatic radical is a chemical structure (d)

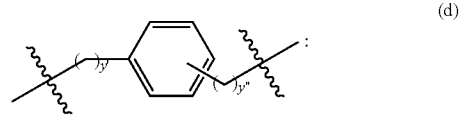

(d)

where y' is an integer>0, preferably from 0 to 24; where y" is an integer >0, preferably from 0 to 24; and where preferably, at the same time, y'+y"≤24.

A divalent heteroaromatic radical is a divalent aromatic radical which additionally has at least one heteroatom, especially at least one heteroatom selected from the group consisting of nitrogen, oxygen, sulphur, within or outside the aromatic ring, preferably within the aromatic ring, but is especially joined to the rest of the molecule via carbon atoms.

"Optionally substituted (hetero)aromatic radical" especially denotes unsubstiuted (hetero)aromatic radical and preferably unsubstituted aromatic radical.

"Substituted or unsubstituted (hetero)aromatic radical" especially denotes unsubstituted (hetero)aromatic radical and preferably unsubstituted aromatic radical.

"Substituted (hetero)aromatic radical" in the context of the invention especially means that, in the (hetero)aromatic radical in question, a hydrogen atom bonded to a carbon atom in the group in question is replaced by a group selected from alkyl group, alkenyl group, alkynyl group, haloalkyl group, —$NO_2$, —CN, —F, —Cl, —Br, —I, —C(=O)$NR^{I}R^{II}$, —$NR^{III}R^{V}$, preferably —$NO_2$, —CN, —F, —Cl, alkyl group having 1 to 10 carbon atoms, alkenyl group having 2 to 10 carbon atoms, where $R^{I}$, $R^{II}$, $R^{III}$, $R^{V}$ are selected from H, alkyl group having preferably 1 to 10 carbon atoms, alkenyl group having 2 to 10 carbon atoms, haloalkyl group having preferably 1 to 10 carbon atoms, aromatic, heteroaromatic, and where $R^{III}$ in the case that $R^{V}$=alkyl or haloalkyl may also be —O..

"Where the optionally substituted aliphatic radical may additionally have at least one group selected from ether, thioether, optionally nitroxylated amino ether, carbonyl group, carboxylic ester group, carboxamide group, sulphonic ester group, phosphoric ester" means:

In the case of ether, that an —O— group is present in the optionally substituted aliphatic radical at least between two sp-hybridized carbon atoms of the aliphatic radical, preferably between two —$CH_2$— groups of the aliphatic radical, even more preferably between two —$CH_2CH_2$— groups of the aliphatic radical.

In the case of thioether, that an —S— group is present in the optionally substituted aliphatic radical at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of the optionally nitroxylated amino ether, that an —NR'— with R'=H, —O.group or alkyl having 1 to 10 carbon atoms, preferably R'=H or alkyl having 1 to 10 carbon atoms, is present in the optionally substituted aliphatic radical at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of the carbonyl group, that a —C(=O)— group is present in the optionally substituted aliphatic radical at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of the carboxylic ester group, that a —C(=O)—O— group is present in the optionally substituted aliphatic radical at least between two sp-hybridized carbon atoms of the aliphatic radical, preferably between two —$CH_2$— groups of the aliphatic radical, even more preferably between two —$CH_2CH_2$— groups of the aliphatic radical.

In the case of the carboxamide group, that a —C(=O)—NU— group with U=H or alkyl having 1 to 10 carbon atoms is present in the optionally substituted aliphatic radical at least between two $sp^3$-hybridized carbon atoms of the aliphatic radical, preferably between two —$CH_2$— groups of the aliphatic radical, even more preferably between two —$CH_2CH_2$— groups of the aliphatic radical.

In the case of the sulphonic ester group, that an —$S(O)_2O$— group is present in the optionally substituted aliphatic radical at least between two sp-hybridized carbon atoms of the aliphatic radical, preferably between two —$CH_2$— groups of the aliphatic radical, even more preferably between two —$CH_2CH_2$— groups of the aliphatic radical.

In the case of the phosphoric ester group, that a group selected from —OP(=O)($O^-$($W^{d+}$)$_{1/z}$)—O—, —OP(=O)(OR")—O— where R"=H or alkyl group having 1 to 10 carbon atoms is present in the optionally substituted aliphatic radical at least between two sp-hybridized carbon atoms of the aliphatic radical, preferably between two —$CH_2$ groups of the aliphatic radical, even more preferably between two —$CH_2CH_2$— groups of the aliphatic radical.

In this case, $W^{d+}$ is selected from the group consisting of alkali metal cation, where the alkali metal cation is preferably selected from the group consisting of $Li^+$, $Na^+$, $K^+$, alkaline earth metal cation, where the alkaline earth metal cation is preferably selected from the group consisting of $Mg^{2+}$, $Ca^{2+}$, transition metal cation, where the transition metal cation is preferably selected from the group consisting of iron cation, zinc cation, mercury cation, nickel cation, cadmium cation, and from tetraalkylammonium cation, imidazolium cation, monoalkylimidazolium cation, dialkylimidazolium cation, where the alkyl groups in the tetraalkylammonium cation, monoalkylimidazolium cation, dialkylimidazolium cation each independently preferably have 1 to 30 carbon atoms. Moreover, d indicates the number of positive charges of $W^{d+}$.

Preferably, $W^{d+}$ is selected from the group consisting of $Li^+$, $Na^+$, $K^+$, $Mg^{2+}$, $Ca^{2+}$, $Zn^{2+}$, $Fe^{2+}$, $Fe^{3+}$, $Cd^{2+}$, $Hg^+$, $Hg^{2+}$, $Ni^{2+}$, $Ni^{3+}$, $Ni^{4+}$, where d in the case of each of $Li^+$, $Na^+$, $K^+$, $Hg^+$=1, where d in the case of each of $Mg^{2+}$, $Ca^{2+}$, $Zn^{2+}$, $Cd^{2+}$, $Hg^{2+}$, $Ni^{2+}$, $Fe^{2+}$=2, where d in the case of $Fe^{3+}$, $Ni^{3+}$=3, where d in the case of $Ni^{4+}$=4.

Fields of Use of the Polymer $P^1$ Prepared by the Process According to the Invention The polymer $P^1$ is especially suitable for use as redox-active electrode material in an electrical charge storage means, preferably for storage of electrical energy, and more preferably as a positive electrode element.

More preferably, the redox-active electrode material takes the form of an at least partial surface coating of electrode elements for electrical charge storage means, especially secondary batteries. Electrode elements here comprise at least one surface layer and one substrate.

A redox-active material for storage of electrical energy is a material which can store electrical charge and release it again, for example by accepting and releasing electrons. This material can be used, for example, as an active electrode material in an electrical charge storage means. Such electrical charge storage means for storage of electrical energy are especially selected from the group consisting of secondary batteries (also called "accumulators"), redox flow batteries, supercapacitors, and are preferably secondary batteries.

Preferably, the electrical charge storage means is a secondary battery. A secondary battery comprises a negative electrode and a positive electrode which are separated from one another by a separator, and an electrolyte which surrounds the electrodes and the separator.

The separator is a porous layer which is ion-permeable and enables the balancing of the charge. The task of the separator is to separate the positive electrode from the negative electrode and to enable balancing of charge through permutation of ions. The separator used in the secondary battery is especially a porous material, preferably a membrane consisting of a polymeric compound, for example polyolefin, polyamide or polyester. In addition, it is possible to use separators made from porous ceramic materials.

The main task of the electrolyte is to assure ion conductivity, which is needed to balance the charge. The electrolyte of the secondary battery may be either a liquid or an oligomeric or polymeric compound having high ion conductivity ("gel electrolyte" or "solid state electrolyte").

Preference is given, however, to an oligomeric or polymeric compound.

If the electrolyte is liquid, it is especially composed of one or more solvents and one or more conductive salts.

The solvent of the electrolytes preferably independently comprises one or more solvents having a high boiling point and high ion conductivity but low viscosity, for example acetonitrile, dimethyl sulphoxide, ethylene carbonate, propylene carbonate, dimethyl carbonate, diethyl carbonate, methyl ethyl carbonate, γ-butyrolactone, tetrahydrofuran, dioxolane, 1,2-dimethoxyethane, 1,2-diethoxyethane, diglyme, triglyme, tetraglyme, ethyl acetate, 1,3-dioxolane or water.

The conductive salt in the electrolyte consists of a cation of the formula $M^{e+}$ and an anion of the formula $An^{f-}$ in the formula $(M^{e+})_a (An^{f-})_b$ where e and f are integers depending on the charge of M and An; a and b are integers which represent the molecular composition of the conductive sat.

Cations used in the abovementioned conductive salt are positively charged ions, preferably metals of the first and second main groups, for example lithium, sodium, potassium or magnesium, but also other metals of the transition groups, such as zinc, and organic cations, for example quaternary ammonium compounds such as tetraalkylammonium compounds. The preferred cation is lithium.

Anions used in said conductive salt are preferably inorganic anions such as hexafluorophosphate, tetrafluoroborate, triflate, hexafluoroarsenate, hexafluoroantimonate, tetrafluoroaluminate, tetrafluoroindate, perchlorate, bis(oxalato)borate, tetrachloroaluminate, tetrachlorogallate, but also organic anions, for example $N(CF_3SO_2)_2^-$, $CF_3SO_3^-$, alkoxides, for example tert-butoxide or iso-propoxide, but also halides such as fluoride, chloride, bromide and iodide. The preferred anion is perchlorate, $ClO_4^-$.

The preferred conductive salt is thus $LiClO_4$.

If ionic liquids are used, they can be used either as solvent of the electrolyte, as conductive salt, or else as complete electrolyte.

In the embodiment in which the redox-active electrode material takes the form of an at least partial surface coating of electrode elements for electrical charge storage means, especially secondary batteries, an electrode element has an at least partial layer on a substrate surface. This layer especially comprises a composition comprising the polymer according to the invention as redox-active material for charge storage and especially at least also a conductivity additive and especially also at least one binder additive.

The application of this composition (another expression for composition: "composite") on the substrate is possible by means of methods known to those skilled in the art. More particularly, the polymer according to the invention is applied on the substrate with the aid of an electrode slurry. The substrate of the electrode element is especially selected from conductive materials, preferably metals, carbon materials, oxide substances.

Preferred metals are selected from platinum, gold, iron, copper, aluminium or a combination of these metals. Preferred carbon materials are selected from glassy carbon, graphite film, graphene, carbon sheets. Preferred oxide substances are, for example, selected from the group consisting of indium tin oxide (ITO), indium zinc oxide (IZO), antimony zinc oxide (AZO), fluorine tin oxide (FTO) or antimony tin oxide (ATO).

The surface layer of the electrode element comprises at least the polymer according to the invention as redox-active material for charge storage and especially at least a conductivity additive and a binder additive.

The conductivity additive is especially at least one electrically conductive material, preferably selected from the group consisting of carbon materials, electrically conductive polymers, and especially carbon materials. Carbon materials are especially selected from the group consisting of carbon platelets, carbon fibres, carbon nanotubes, graphite, carbon black, graphene, and are more preferably carbon fibres. Electrically conductive polymers are especially selected from the group consisting of poyanilines, polythiophenes, polyacetylenes, poly(3,4-ethylenedioxythiophene) polystyrenesulphonate (=PEDOT:PSS), polyarcenes.

Binder additives are especially materials having binder properties and are preferably polymers selected from the group consisting of poytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

The polymer $P^2$ is especially applied to the substrate of the electrode element in an electrode slurry.

The electrode slurry is a solution or suspension and comprises the polymer according to the invention and especially the above-described conductivity additive and the above-described binder additive.

The electrode slurry preferably comprises a solvent and further constituents comprising redox-active material for storage of electrical energy (which is especially the polymer according to the invention), and preferably also the conductivity additive and the binder additive.

In the further constituents, preferably, the proportion of the redox-active material for storage of electrical energy (which is especially the polymer according to the invention) is from 5 to 100 percent by weight, the proportion of the conductivity additive from 0 to 80 and preferably 5 to 80 percent by weight, and the proportion of binder additive from 0 to 10 and preferably 1 to 10 percent by weight, where the sum total is 100 percent by weight.

Solvents used for the electrode slurry are independently one or more solvents, preferably solvents having a high boiling point, more preferably selected from the group consisting of N-methyl-2-pyrrolidone, water, dimethyl sulphoxide, ethylene carbonate, propylene carbonate, dimethyl carbonate, methyl ethyl carbonate, γ-butyrolactone, tetrahydrofuran, dioxolane, sulpholane, N,N'-dimethylformamide, N,N'-dimethylacetamide. The concentration of the redox-active material, especially of the polymer according to the invention for storage of electrical energy in the abovementioned electrode slurry is preferably between 0.1 and 10 mg/ml, more preferably between 0.5 and 5 mg/l.

If the polymer of this invention as redox-active material is used as positive electrode element for electrical charge storage means, the redox-active material used for electrical charge storage in the negative electrode is a material which exhibits a redox reaction at a lower electrochemical potential than the polymer of this invention. Preference is given to those materials selected from the group consisting of carbon materials, which are especially selected from the group consisting of graphite, graphene, carbon black, carbon fibres, carbon nanotubes, metals or alloys, which are especially selected from the group consisting of lithium, sodium, magnesium, lithium-aluminium, Li—Si, Li—Sn, Li—Ti, Si, SiO, Si$_2$, Si—SiO$_2$ complex, Zn, Sn, SnO, SnO$_2$, PbO, PbO$_2$, GeO, GeO$_2$, WO$_2$, MoO$_2$, Fe$_2$O$_3$, Nb$_2$O$_5$, TiO$_2$, Li$_4$Ti$_5$O$_{12}$, and Li$_2$Ti$_3$O$_7$, and organic redox-active materials. Examples of organic redox-active materials are compounds having a stable organic radical, compounds having an organosulphur unit, having a quinone structure, compounds having a dione system, conjugated carboxylic acids and salts thereof, compounds having a phthalimide or naphthalimide structure, compounds having a disulphide bond and compounds having a phenanthrene structure and derivatives thereof. If an abovementioned redox-active oligomeric or polymeric compound is used in the negative electrode, this compound may also be a composite, i.e. a composition, consisting of this oligomeric or polymeric compound, a conductivity additive and a binder additive in any ratio. The conductivity additive in this case too is especially at least one electrically conductive material, preferably selected from the group consisting of carbon materials, electrically conductive polymers, and especially carbon materials. Carbon materials are especially selected from the group consisting of carbon fibres, carbon nanotubes, graphite, carbon black, graphene, and are more preferably carbon fibres. Electrically conductive polymers are especially selected from the group consisting of polyanilines, polythiophenes, polyacetylenes, poly(3,4-ethylenedioxythiophene) polystyrenesulphonate (="PEDOT:PSS"), polyarcenes. Binder additives in this case too are especially materials having binder properties and are preferably polymers selected from the group consisting of poytetrafluoroethylene, polyvinylidene fluoride, polyhexafluoropropylene, polyvinyl chloride, polycarbonate, polystyrene, polyacrylates, polymethacrylates, polysulphones, cellulose derivatives, polyurethanes.

This composite may, as described above, be present as a layer on a substrate through a known film-forming process with the aid of an electrode slurry.

The examples which follow are intended to further elucidate the invention, but without restricting it thereto.

EXAMPLES

I. Chemicals Used 2,2,6,6-Tetramethyl-4-piperidinyl methacrylate (CAS number 31582-45-3; melting point 61° C., abbreviated hereinafter as "TAA-ol-MA") was synthesized by prior art methods.

Ethylene glycol dimethacrylate (CAS number: 97-90-5) was obtained from Evonik.

Ammonium peroxodisulphate (CAS number: 7727-54-0) was obtained from Sigma Aldrich.

Polyoxyethylene nonylphenyl ether (CAS number 68412-54-4) was obtained from Sigma Aldrich.

Sodium dodecylbenzenesulphonate (CAS number-25155-30-0) was obtained from Sigma Aldrich.

4,4'-Azobis(4-cyanovaleric acid) (CAS number-2638-94-0) was obtained from Wako V-501 #AWL2803.

Sodium tungstate dihydrate (CAS number: 10213-10-2) was obtained from Sigma Aldrich.

Ethylenediaminetetraacetic acid (abbreviated hereinafter as "EDTA"; CAS number-60-00-4) was obtained from Roth.

TEMPO (2,2,6,6,-Tetramethylpiperidinyl-N-oxyl; CAS number 2564-83-2) was obtained from Sigma-Aldrich.

II. Polymerization of TAA-ol to poly(2,2,6,6-tetramethylpiperidinyloxylmethacrylate) 1

150.0 g of TAA-ol-MA (melting point 61° C.), 1 g of a mixture of 2 parts sodium dodecylbenzenesulphonate and 1 part polyoxyethylene nonylphenyl ether and 2.7 g of ethylene glycol dimethacrylate were added to 467 ml of water in a 1 l jacketed reactor with stirrer and condenser, and heated to 65° C. Thereafter, the mixture was dispersed at 6000 rpm for 15 min with an Ultraturrax (machine: Ultra-Turrax T series disperser; from IKA-Werke GmbH und Co. KG; model: T 25 D; dispersion tool: S 25 N-25 G) and then while cooling to 40° C. over 30 minutes.

The dispersion thus obtained was transferred into a reactor, and equilibrated further therein to 40° C. The dispersion was placed under a nitrogen blanket and the passage of nitrogen was continued during the reaction that followed. Thereafter, 0.27 g of ammonium peroxodisulphate was added and the mixture was stirred overnight at a temperature between 40° C. and 45° C. To complete the reaction, the mixture was then polymerized at 65° C. for another 1 hour. Then the solution was cooled to room temperature.

The quantitative yield of polymer 1 corresponded to ~90%. The polymer 1 was in the form of a finely distributed precipitate in the reactor and could be filtered and isolated without any problem.

III. Comparative Experiments C1 to C6 and Inventive Experiments I1 to I3: Oxidation of 1 to poly(2, 2,6,6-tetramethylpiperidinyloxylmethacrylate) 2

40 g of polymer 1 obtained as described in section II were converted to a slurry in a flask with 20 g of water. The temperature of the flask was adjusted by means of a water bath or ice bath to room temperature (=25° C.; C2, C4, C5, C6) or 1° C. (C, C3, I1, I3). While stirring with a stirrer motor, 80 g of water (C1, C2), of a mixture of water with methanol (C3, C4), of ethanol (C5, C6), or of a mixture of water with ethanol (I1, I2, I3), were then added. In the case of comparative experiments C5 and C6, for establishment of the desired ratio of ethanol and water, the corresponding proportion of the water used to form the slurry was removed prior to addition of the ethanol. In the case of comparative experiment C3 and of inventive experiments I1 and I3, after addition of the alcoholic solution, the suspension obtained was cooled to 0° C. (C3, I1) or with a coolant mixture to ~–12° C. (I3). The suspension thus obtained was then stirred for a further 30 minutes, in order to allow the polymer to swell.

This was followed by the addition of 1.76 g of sodium tungstate dihydrate and 0.45 g of EDTA. After ~1 minute, for oxidation, firstly 27.2 g of 30% aqueous hydrogen peroxide solution was then added in portions, followed after a further half an hour by 27.2 g of 50% aqueous hydrogen peroxide solution. The mixture was then stirred at the temperature $T_1$ specified in the table in section V for 90 hours and, toward the end, heated to 40° C. for another 1 hour in each case.

Thereafter, the reaction mixture was cooled, filtered through a fluted filter, washed three times with 50 g of water and then put in a vacuum drying cabinet overnight. The completeness of the oxidation (degree of oxidation=proportion of secondary NH groups that have been oxidized to N O.) was determined by means of ESR.

IV. ESR Analysis

Electron spin resonance spectra were recorded by means of a spin EMXmicro CW-EPR spectrometer (EMX micro EMM-6/1/9-VT control unit, ER 070 magnet, EMX premium ER04 X-band microwave bridge, equipped with a EMX standard resonator, EMX080 power unit) from Bruker Corporation. The samples were analysed at room temperature and quantitatively evaluated with the Bruker Xenon software package, version 1.1b86. The SpinCount™ software module. The spectrometer was calibrated with TEMPO (99% purity, Sigma-Aldrich Chemie GmbH) as reference. No internal reference was present during the sample measurement. Three samples were analysed for each substance.

V. Results

The following table states the ratio of water and methanol/ethanol that was present in the solution during the oxidation, what temperature was utilized in the oxidation and how high the degree of oxidation determined by means of ESR was:

| Experiment | Solvents used | | | Ratio of water: alcohol | Temperature $T_1$ | Degree of oxidation |
|---|---|---|---|---|---|---|
| | $H_2O$ | Methanol | Ethanol | | | |
| C1 | x | — | — | — | 1° C. | 81% |
| C2 | x | — | — | — | 25° C. | 96% |
| C3 | x | x | — | 7.1:1 | 0° C. | 88% |
| C4 | x | x | — | 7.1:1 | 25° C. | 96% |
| C5 | x | x | — | 0.75:1 | 25° C. | 96.6% |
| C6 | x | — | x | 0.75:1 | 25° C. | 95.2% |
| I1 | x | — | x | 7.1:1 | 0° C. | 98% |
| I2 | x | — | x | 7.1:1 | 25° C. | 98% |
| I3 | x | — | x | 1.1:1 | ~−12° C. | 98.4% |

VI. Results

As apparent from the table shown in point V, a better degree of oxidation is achieved when a mixture of ethanol and water is used compared to water (C1, C2) or a mixture of water with methanol (C3, C4). However, this effect was observed only for those solvents in which ethanol is present in deficiency in relation to water, as apparent from the comparison of comparative examples C5 and C6 with inventive examples I1, I2 and I3.

The degree of oxidation of 98% or 98.4% observed in inventive examples I1, I2 and I3 is higher than that described in the prior art (page 8 line 33 of EP 1 911 775 A1 describes a conversion efficiency of 95.5%).

This result, namely that such a high degree of oxidation can be observed in an aqueous solvent containing ethanol in deficiency relative to water, is completely surprising.

The invention claimed is:

1. A process for preparing a polymer $P^1$ comprising $n^1$ repeat units of a chemical structure (I)

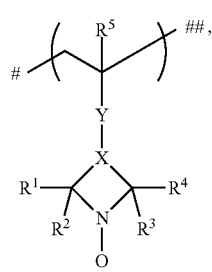

said process, comprising:
oxidizing a polymer $P^2$ comprising $n^2$ repeat units of a chemical structure (II)

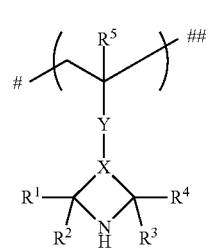

in a solvent comprising water and ethanol, wherein the ethanol is present in the solvent in deficiency relative to water in terms of mass ratio,
wherein $n^1$, $n^2$ are each independently an integer in a range of 4-3 000 000,
wherein the repeat units of the chemical structure (I) within the polymer $P^1$ are the same or at least partly different from one another,
wherein the repeat units of the chemical structure (I) within the polymer $P^1$ are joined to one another in such a way that the bond identified by "#" in a particular repeat unit is joined to the bond identified by "##" in an adjacent repeat unit,
wherein the repeat units of the chemical structure (II) within the polymer $P^2$ are the same or at least partly different from one another,
wherein the repeat units of the chemical structure (II) within the polymer $P^2$ are joined to one another in such a way that the bond identified by "#" in a particular repeat unit is joined to the bond identified by "##" in an adjacent repeat unit, and
wherein, in the chemical structures (I) and (II),
the $R^1$, $R^2$, $R^3$, $R^4$, $R^5$ radicals are each independently selected from the group consisting of hydrogen, branched alkyl group having 1 to 4 carbon atoms and unbranched alkyl group having 1 to 4 carbon atoms,
X is selected from the group consisting of *—$CH_2$—C'H—$CH_2$—**, *—C'H—$CH_2$—**, and *—C'=CH—**,
wherein
"*" in each case denotes the bond to the carbon atom joined to $R^1$ and $R^2$,
"**" in each case denotes the bond to the carbon atom joined to $R^3$ and $R^4$,
"C'" denotes a carbon atom additionally joined to the Y radical,
Y is selected from the bridging radicals (III) and (IV),
wherein (III) has a structure &—$(Y^1)_{p1}$—[C=$X^1]_{p2}$—$(Y^2)_{p3}$—B—$(Y^3)_{p6}$—[C=$X^2]_{p5}$—$(Y^4)_{p4}$,&&, and
wherein (IV) has a structure &—$(Y^5)_{p9}$—(C=$X^3)_{p8}$—$(Y^6)_{p7}$—&&,
wherein, in the bridging radicals (III) and (IV),
p, p2, p3 are each 0 or 1, with the proviso that it is not simultaneously the case that p1=p3=1 and p2=0,
p4, p5, p6 are each 0 or 1, with the proviso that it is not simultaneously the case that p4=p6=1 and p5=0,
p7, p8, p9 are each 0 or 1, with the proviso that it is not simultaneously the case that p7=p9=1 and p8=0, and that, when p7=1 and p8=0, p9=0, $X^1$, $X^2$, $X^3$ are independently selected from the group consisting of O, and S, $Y^1$, $Y^2$, $Y^3$, $Y^4$, $Y^5$, $Y^6$ are independently selected from the group consisting of O, S, NH, and N-alkyl, and $Y^1$, when p1=1, p2=p3=0, may also be N O•,
$Y^4$, when p4=1, p5=p6=0, may also be N O•,
$Y^5$, when p9=1, p7=p8=0, may also be N O•, B is a divalent, optionally substituted (hetero) aromatic radical or a divalent, optionally substituted aliphatic radical, wherein the optionally substituted aliphatic radical may additionally have at least one group selected from the group consisting of ether, thioether, optionally nitroxylated amino ether, carbonyl group, carboxylic ester group, carboxamide group, sulphonic ester group, and phosphoric ester, "&&" for Y denotes the bond via which Y is joined to X "&" for Y denotes the bond via which Y is joined to the carbon atom joined to $R^5$.

2. The process according to claim 1, wherein $X^1$, $X^2$, $X^3$, $Y^1$, $Y^2$, $Y^3$, $Y^4$, $Y^5$, $Y^6$ are independently selected from the group consisting of O, and S, wherein B is a divalent, optionally substituted (hetero) aromatic radical or a divalent, optionally substituted aliphatic radical, and wherein the optionally substituted aliphatic radical may additionally have at least one group selected from the group consisting of ether, thioether, carbonyl group, carboxylic ester group, sulphonic ester group, and phosphoric ester.

3. The process according to claim 2, wherein $R^1$=$R^2$=$R^3$=$R^4$=methyl and $R^5$=hydrogen or methyl, wherein B is a divalent (hetero)aromatic radical or a divalent aliphatic radical optionally substituted by a group selected from the group consisting of —F, —Cl, —Br, and —I, wherein the optionally substituted aliphatic radical may additionally have at least one group selected from the group consisting of ether, and thioether.

4. The process according to claim 3, wherein $X^1$=$X^2$=$X^3$=$Y^1$=$Y^2$=$Y^3$=$Y^4$=$Y^5$=$Y^6$=O, and wherein B is phenylene or an alkylene radical optionally substituted by at least one group selected from the group consisting of —F, —Cl, —Br, and —I.

5. The process according to claim 1, wherein X=*—$CH_2$—C'H—$CH_2$—**.

6. The process according to claim 5, wherein the chemical structure (I) has the following structure (I)"", and the general chemical structure (II) has the following structure (II)"":

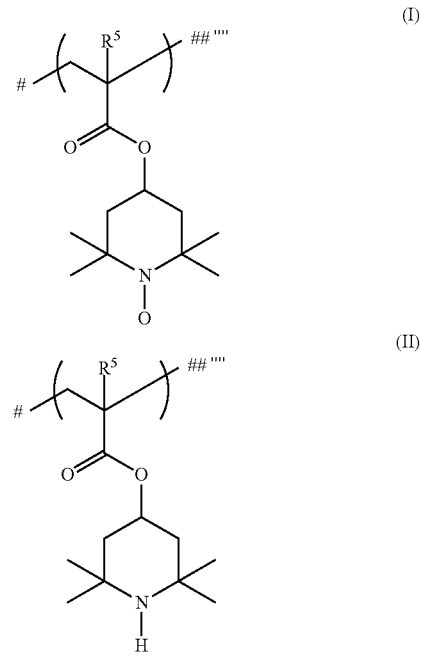

wherein $R^5$=methyl or hydrogen.

7. The process according to claim 1, which is conducted at a temperature $T_1 \leq 40°$ C.

8. The process according to claim 1, wherein a mass ratio of water to ethanol in the solvent is in a range of 51:49 to 99:1.

9. The process according to claim 1 wherein a proportion of a sum total of the weights of ethanol and water in the solvent is at least 50% by weight, based on g total weight of the solvent.

10. The process according to claim 8, wherein a proportion by weight of all $C_1$-$C_4$ alcohols other than ethanol in the solvent is less than 50% by weight, based on the weight of the ethanol encompassed by the solvent.

11. The process according to claim 1, wherein $n^1$, $n^2$ are each independently an integer in a range of 4-1 000 000.

* * * * *